(12) United States Patent
Koyama

(10) Patent No.: US 7,966,907 B2
(45) Date of Patent: Jun. 28, 2011

(54) FINGER JOINT MECHANISM

(75) Inventor: Junji Koyama, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 568 days.

(21) Appl. No.: 12/084,564

(22) PCT Filed: Dec. 20, 2005

(86) PCT No.: PCT/JP2005/023327
§ 371 (c)(1),
(2), (4) Date: May 6, 2008

(87) PCT Pub. No.: WO2007/072546
PCT Pub. Date: Jun. 28, 2007

(65) Prior Publication Data
US 2009/0249918 A1     Oct. 8, 2009

(51) Int. Cl.
*F16H 33/00* (2006.01)
(52) U.S. Cl. .......................................... 74/640; 74/665 F
(58) Field of Classification Search ................... 74/640, 74/665 E
See application file for complete search history.

(56) References Cited

U.S. PATENT DOCUMENTS

| | | | | |
|---|---|---|---|---|
| 4,770,059 A | * | 9/1988 | Beyer | 74/640 |
| 5,222,409 A | * | 6/1993 | Dalakian | 74/479.01 |
| 7,077,446 B2 | * | 7/2006 | Kameda et al. | 294/106 |
| 2002/0026852 A1 | * | 3/2002 | Kiyosawa et al. | 74/640 |

FOREIGN PATENT DOCUMENTS

| | | |
|---|---|---|
| JP | 63-62934 A | 3/1988 |
| JP | 63-288678 A | 11/1988 |

OTHER PUBLICATIONS

International Search Report, Apr. 11, 2006.

* cited by examiner

*Primary Examiner* — Justin Holmes
(74) *Attorney, Agent, or Firm* — Buchanan Ingersoll & Rooney PC

(57) ABSTRACT

A finger joint mechanism (1) having two wave gear reduction drives (20, 30) disposed coaxially with each other, in which rotational force of a motor (40) is transmitted to a rotation input shaft (13) common to the drive gears through a driving bevel gear (42) and a driven bevel gear (43). Output shafts (11, 12) are formed integrally with bosses (24, 34) of the cup-like flexible external gears (22, 32) of the wave gear drives (20, 30), and mounting arms (9, 10) of a rotating member (3) are fixedly connected to the output shafts. The wave gear reduction drives, which can be easily reduced in size, are used as the reduction gears for a rotary actuator (5) assembled in the finger joint mechanism. Since the finger joint mechanism uses the two wave gear reduction drives, the rate of increase in torque capacity against the rate of increase in installation space is much higher than a case where one gear reduction drive with a large model number is used to increase torque capacity of the mechanism.

3 Claims, 3 Drawing Sheets

US 7,966,907 B2

FINGER JOINT MECHANISM

TECHNICAL FIELD

The present invention relates to a finger joint mechanism composed of a motor and a gear drive used in a robot hand or the like, and more specifically relates to a finger joint mechanism that is small, compact, and has a high torque capacity.

BACKGROUND ART

A finger joint mechanism composed of a motor and a gear drive is used in a robot hand or the like. The torque capacity of the finger joint mechanism is limited by the gear drive that drives a joint in the finger joint mechanism. For this reason, a higher model number must be used for the gear drive in order to increase the torque capacity of the finger joint.

However, using a higher model number for the gear drive increases the outside-diameter dimensions of the joint mechanism because of the increased dimensions of the gear drive. Accordingly, there is a problem in that the torque capacity cannot be increased in the case of a finger joint mechanism that has a small diameter.

DISCLOSURE OF THE INVENTION

In view of the above, an object of the present invention is to provide a finger joint mechanism that is small, compact, and has a high torque capacity.

In order to solve the problems described above, the finger joint mechanism of the present invention is characterized in comprising:
a housing;
a rotating member;
a plurality of wave gear reduction drives that are incorporated into the housing in order to rotate the rotating member about a preset joint axial line; and
a motor that is mounted in the housing, wherein
input rotation shafts of the wave reduction gear drives are coaxially connected and center axial lines thereof match the joint axial line;
the motor is disposed in a state in which an output rotation shaft thereof is perpendicular to the input rotation shafts;
a driving bevel gear is mounted coaxially with the output rotation shaft of the motor;
a driven bevel gear that meshes with the driving bevel gear is mounted coaxially with the input rotation shafts;
a cup-shaped flexible external gear of each of the wave gear drives is rotatably supported by the housing via a bearing;
an annular rigid internal gear of each of the wave gear drives is fixed to the housing;
the input rotation shaft of each of the wave gear drives is rotatably supported via a bearing on a portion of a boss that is formed on a center portion of a cup-shaped bottom surface of each of the cup-shaped flexible external gears;
the flexible external gears are flexed in the radial direction by wave generators mounted coaxially with the input rotation shafts, and are made to partially mesh with the rigid internal gears;
a joint shaft that is fixedly connected to the rotation-side housing is formed on each of the bosses of each of the flexible external gears; and
the meshing position of each of the flexible external gears and each of the rigid internal gears moves in the circumferential direction, each of the flexible external gears rotates at a reduced speed at a gear ratio produced by the difference in the number of teeth of the two gears, and the rotating member that is fixedly connected to the joint shaft rotates when each of the wave generators is rotated by the motor.

The present invention is also characterized in that first and second wave gear reduction drives are included as the wave gear reduction drives; and the first and second wave gear reduction drives are arranged in a state in which the cup-shaped flexible external gears face in the same direction, in a state in which the open sides of the cup-shaped flexible external gears face each other, or in a state in which the bosses of the cup-shaped flexible external gears face each other.

In the finger joint mechanism of the present invention, a small and compact wave gear reduction drive is used, and a plurality of wave gear reduction drives is used in a state in which the input rotation shafts thereof are coaxially connected and fixed. In this manner, the torque capacity of a finger joint mechanism can be increased without a significant increase in the outside-diameter dimensions by connecting and using a small wave gear reduction drive. Two wave gear reduction drives are generally used, in which case the state of utilizable installation space and the layout of other components can be accommodated by varying the orientation of the wave gear drives.

BEST MODE FOR CARRYING OUT THE INVENTION

The embodiments of the finger joint mechanism to which the present invention has been applied are described with reference to the diagrams below.

Figure 1:
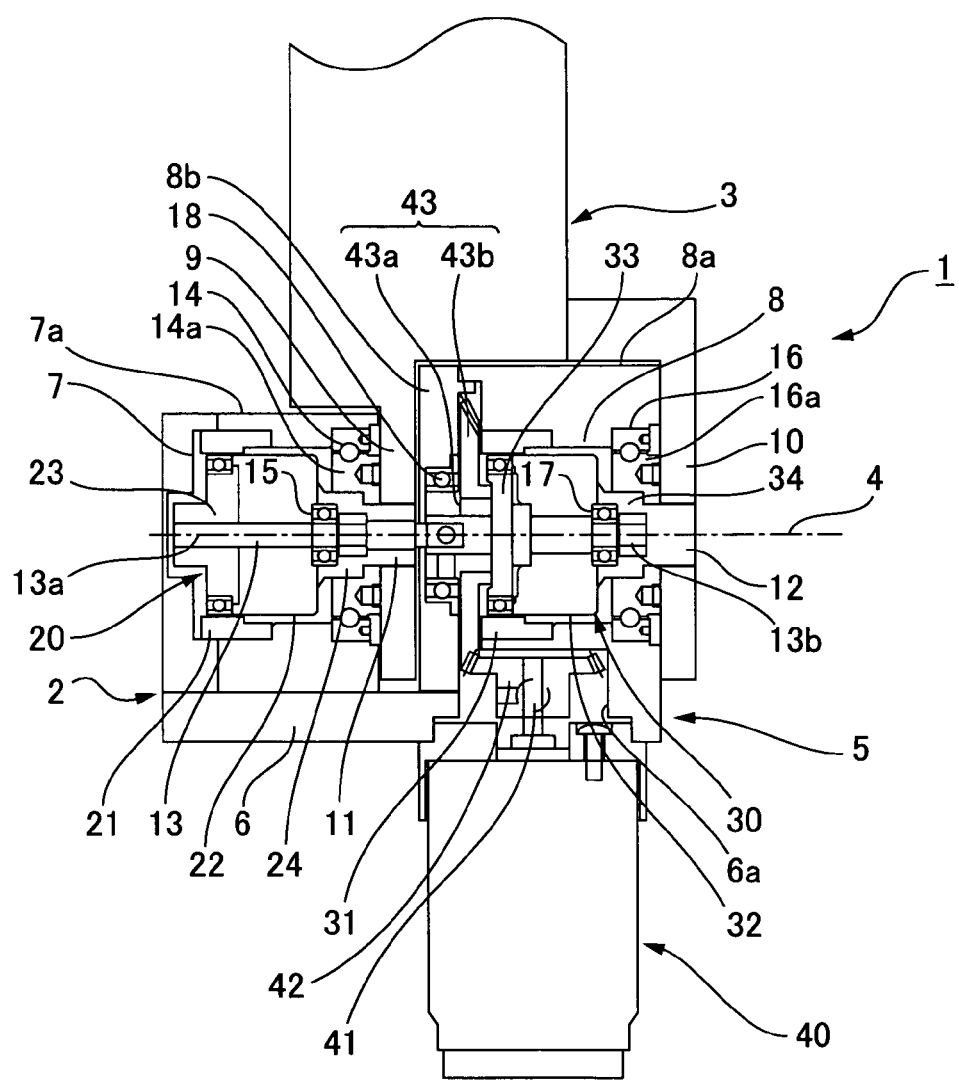
FIG. 1 is a schematic cross-sectional view showing embodiment 1 of the finger joint mechanism to which the present invention has been applied.

FIG. 1 is a schematic cross-sectional view showing embodiment 1 of the finger joint mechanism to which the present invention has been applied. A finger joint mechanism 1 has a housing 2 and a rotating member 3, and a rotary actuator 5 for rotating the rotating member 3 about a joint axial line 4 is mounted on the housing 2.

The housing 2 is provided with a base 6 and two gear drive housing units 7 and 8 positioned toward the front surface of the base 6 at a fixed gap in the direction of the joint axial line 4. The rotating member 3 is provided with a first mounting arm 9 that extends into the gap of the gear drive housing units 7 and 8, and a second mounting arm 10 that extends along the outer surface of the gear drive housing unit 8. These first and second mounting arms 9 and 10 are fixedly connected to first and second output shafts 11 and 12 of the rotary actuator 5. The shape of exterior peripheral surfaces 7a and 8a of the gear drive housing units 7 and 8 of the housing 2 is arcuate about the joint axial line 4 and does not interfere with the rotating member 3.

The rotary actuator 5 is provided with first and second wave gear reduction drives 20 and 30, and a motor 40. The first wave gear reduction drive 20 is incorporated into the gear drive housing unit 7, and the second wave gear reduction device 30 is incorporated into the gear drive housing unit 8. The first and second wave gear reduction drives 20 and 30 have essentially the same structure, and are coaxially disposed so as to face in the same direction. A common rotation input shaft 13 extends along the center of these wave gear reduction drives, and the center axial line of the rotation input shaft 13 matches the joint axial line 4.

The first wave gear reduction drive 20 housed in the gear drive housing unit 7 is provided with an annular rigid internal gear 21, a cup-shaped flexible external gear 22 coaxially disposed inside the internal gear, and an elliptically contoured wave generator 23 coaxially fitted into the external gear. The wave generator 23 is coaxially fixed at a distal end portion 13a of the rotation input shaft 13. The rigid internal gear 21 is fixed to the housing 2. The cup-shaped flexible external gear 22 is disposed so that the bottom surface side of the cup shape faces the other gear drive housing unit 8, and is rotatably supported by a bearing 14 in which a thick cylindrical boss 24 that is formed in the central portion of the bottom surface of the cup is mounted on the side portion of the gear drive housing unit 7.

The rotation input shaft 13 passes through and rotatably extends into the hollow portion of the cylindrical boss 24, and the rotation input shaft 13 is rotatably supported by a bearing 15 that is mounted on the internal peripheral surface of the hollow portion. The first output shaft 11 that protrudes from the bearing 14 to the vicinity of the side surface of the other gear drive housing unit 8 is integrally formed on the cylindrical boss 24. The first mounting arm 9 of the rotating member 3 that is connected to the first output shaft 11 is fixedly fastened to an inner ring 14a of the bearing 14, which integrally rotates with the output shaft 11.

The second wave gear reduction drive 30, which is housed in the other gear drive housing unit 8, has the same structure and is also provided with an annular rigid internal gear 31, a cup-shaped flexible external gear 32 coaxially disposed on the interior of the internal gear, and an elliptically contoured wave generator 33 that is coaxially fitted into the flexible external gear. The wave generator 33 is coaxially fixed to the rotating input shaft 13. The rigid internal gear 31 is fixed to the housing 2. The cup-shaped flexible external gear 32 is disposed in a state in which the open side of the cup shape faces the gear drive housing unit 7, and a thick cylindrical boss 34 that is formed in the center portion of the bottom side of the cup is rotatably supported by a bearing 16 mounted on the side portion of the gear drive housing unit 8.

A rear end portion 13b of the rotation input shaft 13 is rotatably supported by a bearing 17 mounted on the center portion of the cylindrical boss 34. Furthermore, the second output shaft 12 that protrudes from the bearing 16 to the lateral direction of the gear drive housing unit 8 is integrally formed on the cylindrical boss 34. The second mounting arm 10 of the rotating member 3 connected to the second output shaft 12 is fixedly fastened to an inner ring 16a of the bearing 16 that integrally rotates with the output shaft 12.

The motor 40 of the rotary actuator 5 is disposed in a location that faces the gear drive housing unit 8 at the rear surface of the base 6. A rotation output shaft 41 of the motor 40 extends in a direction perpendicular to the joint axial line 4, passes via a through-hole 6a formed in the base 6, and protrudes into the gear drive housing unit 8.

A driving bevel gear 42 is coaxially connected and fixed to the distal end of the rotation output shaft 41. A driven bevel gear 43, which is coaxially fixed to the rotation input shaft 13, meshes with the driving bevel gear 42. The driven bevel gear 43 is provided with an annular boss 43a that is fixed to the rotation input shaft 13 and a gear unit 43b that is fixed to the annular boss 43a. The annular boss 43a is disposed between a side wall 8b on the inner side of the gear drive housing unit 8 and a wave generator 33, and is rotatably supported by a bearing 18 mounted on the side wall 8b.

The operation of the finger joint mechanism 1 having this configuration will be described. Driving the motor 40 causes the rotation of the rotation output shaft 41 to be transmitted to the rotation input shaft 13 via the driving bevel gear 42 and the driven bevel gear 43, and the input shaft 13 to rotate. The wave generators 23 and 33 of the first and second wave gear reduction drives 20 and 30 are fixed to the rotation input shaft 13. Therefore, when the wave generators rotate, a relative rotation produced by the difference in the number of teeth of the two gears is generated between the cup-shaped flexible external gear 22 and the rigid internal gear 21, as well as between the cup-shaped flexible gear 32 and the rigid internal gear 31. Because the rigid internal gears 21 and 31 are fixed, the cup-shaped flexible external gears 22 and 32 perform a rotation, and the output shafts 11 and 12, which are formed in the cup-shaped flexible internal gears, rotate as an integral whole. As a result, the rotating member 3 connected to the output shafts 11 and 12 rotate in a prescribed direction about the joint axial line 4.

In comparison with a case in which a single high-model gear reduction drive is used, the extent to which the torque capacity is increased relative to the increase of the installation space can be enhanced by using the two small-sized wave gear reduction drives 20 and 30. The wave gear reduction drives 20 and 30 are used as gear drives, the wave gear reduction drives have few constituent elements, and the wave gear reduction drives can easily be made smaller and more compact in comparison with other forms of gear drives. Therefore, a finger joint mechanism that is small and compact, and that has a considerable torque capacity can be achieved.

Figure 2:
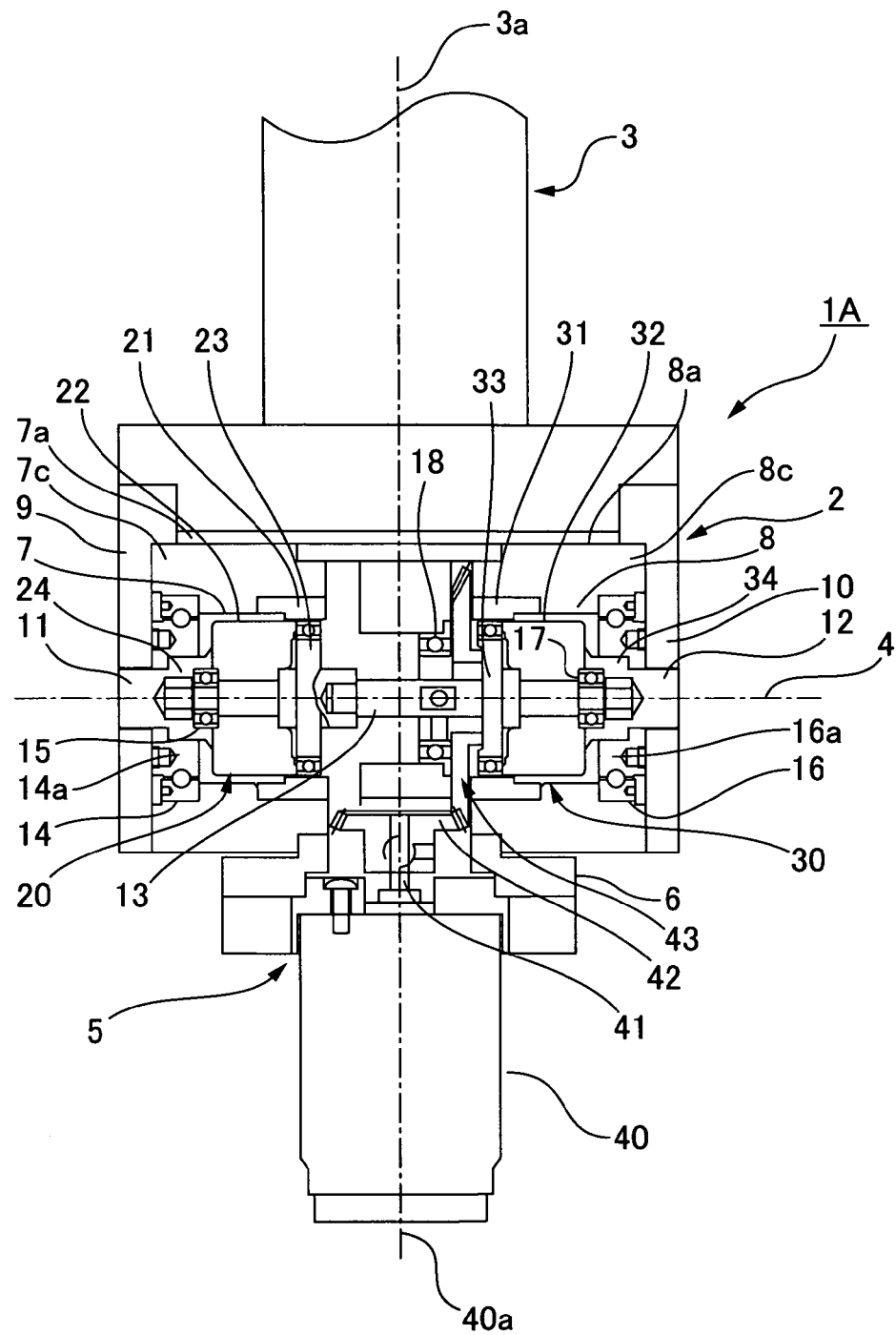
FIG. 2 is a schematic cross-sectional view showing embodiment 2 of the finger joint mechanism to which the present invention has been applied.
Figure 3:
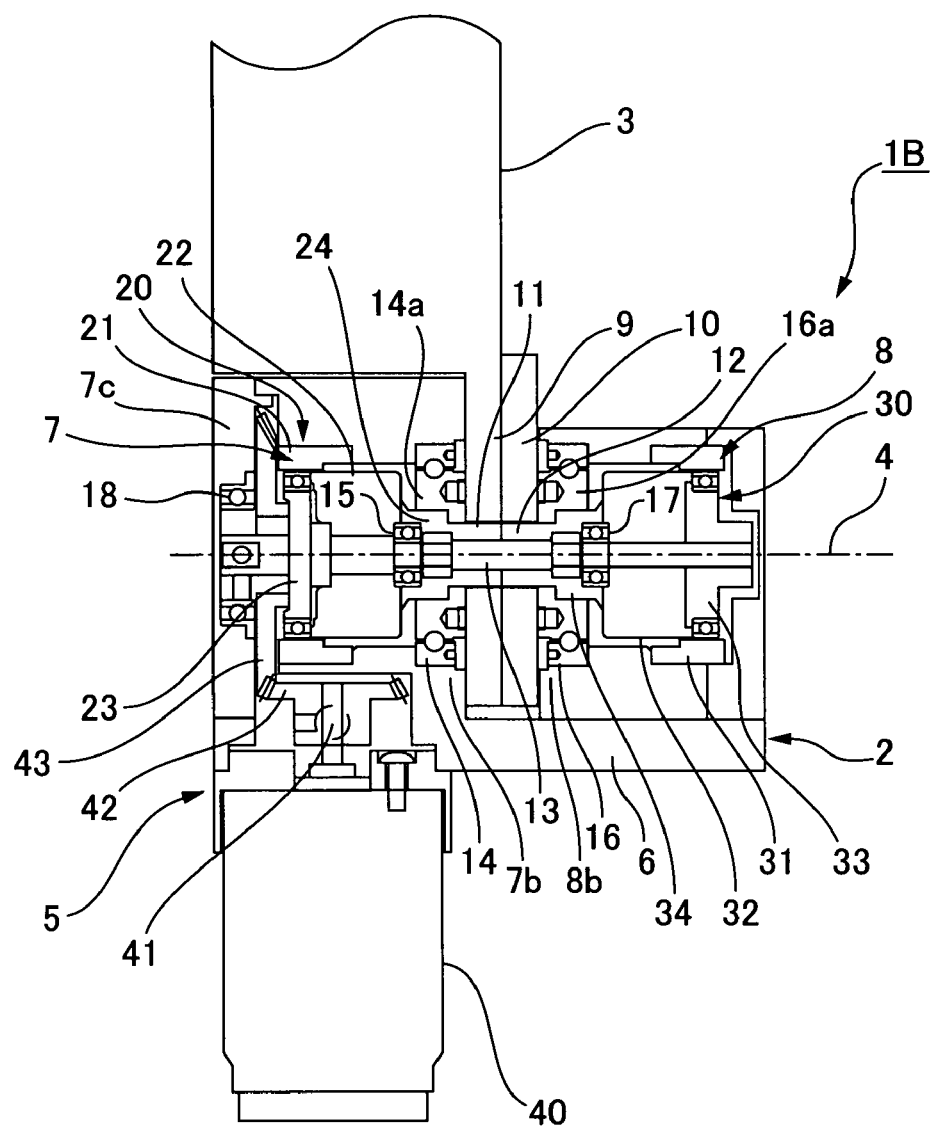
FIG. 3 is a schematic cross-sectional view showing embodiment 3 of the finger joint mechanism to which the present invention has been applied.

Next, FIGS. 2 and 3 are schematic cross-sectional views that show a modified example of the finger joint mechanism 1. The first and second wave gear reduction drives 20 and 30 are configured in a coaxial arrangement facing in opposite directions in the figure joint mechanisms 1A and 1B shown in the diagrams. The essential configuration of the finger joint mechanisms 1A and 1B is the same as the finger joint mechanism 1 of FIG. 1. Therefore, the same reference numerals are used in corresponding locations and a description thereof is omitted.

First, the first and second wave gear reduction drives 20 and 30 are arranged in a state in which the open sides of the cup-shaped flexible external gears 22 and 32 face each other in the finger joint mechanism 1A shown in FIG. 2. As a result, the first and second output shafts 11 and 12 protrude laterally from side walls 7c and 8c on the outside of the gear drive housing units 7 and 8, respectively. The first and second mounting arms 9 and 10 of the rotating member 3 extend along the exterior side surface of the side walls 7c and 8c and are connected to the side walls in a corresponding manner. The motor 40 is disposed in the center of the width direction (in the direction of the joint axial line 4) of the housing 2. A center axial line 40a of the motor matches a center axial line 3a of the rotating member 3 in the finger joint mechanism 1A to make the mechanism into a bilaterally symmetric structure.

Next, the first and second wave gear reduction drives 20 and 30 are arranged in a state in which the bottom surfaces the cup of the cup-shaped flexible external gear 22 and 23 face each other in the finger joint mechanism 1B shown in FIG. 3. As a result, the first and second output shafts 11 and 12 protrude from the side walls 7b and 8b of the interior of the gear drive housing units 7 and 8, respectively, and the first and second mounting arms 9 and 10 of the rotating member 3 are mounted so as to be mutually connected and fixed to the output shafts. In the present example, the motor 40 is disposed in the vicinity of the gear drive housing unit 7. The driven bevel gear 43, which meshes with the driving bevel gear 42 mounted on the rotation output shaft 41, is positioned between the side wall 7c on the exterior of the gear drive housing compartment 7 and the wave generator 23.

Two wave gear reduction drives are used in each of the examples described above, but it is also possible to use three or more wave gear reduction drives. In this case as well, the rotation input shafts of the wave gear reduction drives are coaxially connected and fixed to each other. Alternatively, a common rotation input shaft may be used.

The invention claimed is:

1. A finger joint mechanism comprising:
    a housing;
    a rotating member;
    first and second wave gear reduction drives that are incorporated into the housing in order to rotate the rotating member about a preset joint axial line; and a motor that is mounted in the housing, wherein
    input rotation shafts of the first and second wave gear reduction drives are coaxially connected and center axial lines thereof match the joint axial line;
    the motor is disposed in a state in which an output rotation shaft thereof is perpendicular to the input rotation shafts;
    a driving bevel gear is mounted coaxially with the output rotation shaft of the motor;
    a driven bevel gear that meshes with the driving bevel gear is mounted coaxially with the input rotation shafts;
    cup-shaped flexible external gears of the first and second wave gear reduction drives are rotatably supported by the housing via bearings, respectively;
    annular rigid internal gears of the first and second wave gear reduction drives are fixed to the housing;
    the input rotation shaft of each of the first and second wave gear reduction drives is rotatably supported via a bearing on a portion of a boss that is formed on a center portion of a cup-shaped bottom surface of each of the cup-shaped flexible external gears;
    the flexible external gears are flexed in a radial direction thereof by wave generators mounted coaxially with the input rotation shafts, and are made to partially mesh with the rigid internal gears;
    first and second output shafts are formed on the bosses of the flexible external gears,
    first and second mounting arms extended from the rotating member being fixedly connected to the first and second output shafts, respectively;
    the driven bevel gear mounted coaxially with the input rotation shafts being located between the first and second mounting arms; and
    a meshing position of each of the flexible external gears and each of the rigid internal gears moves in a circumferential direction, each of the flexible external gears rotates at a reduced speed at a gear ratio produced by a difference in the number of teeth of the two gears, and the rotating member that is fixedly connected to the first and second output shafts rotates when each of the wave generators is rotated by the motor, and wherein
    the first and second wave gear reduction drives being arranged in a state in which the cup-shaped flexible external gears face in the same direction, or are arranged in a state in which open sides of the cup-shaped flexible external gears face each other.

2. The finger joint mechanism according to claim 1, wherein
    the first and second wave gear reduction drives being arranged in a state in which the cup-shaped flexible external gears face in the same direction, and
    the second wave gear reduction drive and the driven bevel gear are positioned between the first and second mounting arms.

3. The finger joint mechanism according to claim 1, wherein
    the first and second wave gear reduction drives are arranged in a state in which the open sides of the cup-shaped flexible external gears face each other, and
    wherein the first and second wave gear reduction drives and the driven bevel gear are positioned between the first and second mounting arms.

\* \* \* \* \*